US012576557B2

(12) United States Patent
Zheng et al.

(10) Patent No.: US 12,576,557 B2
(45) Date of Patent: Mar. 17, 2026

(54) MELT IMPREGNATION DEVICE WITH AUTOMATIC LIFTING CHANNEL FOR ADDITIVE MANUFACTURING FILAMENTS

(71) Applicant: NANJING UNIVERSITY OF AERONAUTICS AND ASTRONAUTICS, Nanjing (CN)

(72) Inventors: Jinghua Zheng, Nanjing (CN); Zhongde Shan, Nanjing (CN); Congze Fan, Nanjing (CN); Yiwei Chen, Nanjing (CN); Wenzhe Song, Nanjing (CN); Jingxuan Wang, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 329 days.

(21) Appl. No.: 18/572,780

(22) PCT Filed: Jul. 23, 2022

(86) PCT No.: PCT/CN2022/107550
§ 371 (c)(1),
(2) Date: Dec. 21, 2023

(87) PCT Pub. No.: WO2023/216421
PCT Pub. Date: Nov. 16, 2023

(65) Prior Publication Data
US 2024/0286315 A1 Aug. 29, 2024

(30) Foreign Application Priority Data
May 13, 2022 (CN) ........................ 202210518890.X

(51) Int. Cl.
*B29B 11/00* (2006.01)
*B29B 11/10* (2006.01)
(Continued)

(52) U.S. Cl.
CPC .............. *B29B 11/10* (2013.01); *B29B 11/16* (2013.01); *B29B 15/14* (2013.01); *B29C 64/314* (2017.08); *B33Y 40/10* (2020.01)

(58) Field of Classification Search
CPC ......... B29B 11/10; B29B 11/16; B29B 15/14; B29C 64/118; B29C 64/314; B33Y 40/10
See application file for complete search history.

(56) References Cited

FOREIGN PATENT DOCUMENTS

| CN | 202037882 U | * | 11/2011 |
| CN | 102848489 A | | 1/2013 |

(Continued)

*Primary Examiner* — Yung-Sheng M Tsui
(74) *Attorney, Agent, or Firm* — Bayramoglu Law Offices LLC

(57) ABSTRACT
A composite filament melt impregnation device with an automatic lifting channel for additive manufacturing includes a mechanical lifting device, a heating device, a curved resin impregnation channel, a filament guide block, a single screw extruder, a replaceable combination die nozzle, and a resin riser. The composite filament melt impregnation device can significantly improve the efficiency of replacing filaments and treating broken filaments in a forming process of continuous fiber filaments, reduce the operation difficulty of a production process, and ensure the safety of operators. The design of the resin riser can achieve slight dynamic adjustment of pressure in a melt cavity in the production process, improve the stability of product quality, and ultimately achieve continuous production and rapid replacement of high-performance continuous fiber composites.

10 Claims, 7 Drawing Sheets

(51)  Int. Cl.
      *B29B 11/16*       (2006.01)
      *B29B 15/14*       (2006.01)
      *B29C 64/314*   (2017.01)
      *B33Y 40/10*       (2020.01)

(56)                References Cited

FOREIGN PATENT DOCUMENTS

| | | | | | |
|---|---|---|---|---|---|
| CN | 204674042 | U | | 9/2015 | |
| CN | 207859241 | U | | 9/2018 | |
| CN | 210415591 | U | * | 4/2020 | |
| CN | 111186138 | B | * | 4/2021 | ............. B33Y 40/00 |
| CN | 112847923 | A | * | 5/2021 | ............. B29B 15/14 |
| CN | 114454513 | A | | 5/2022 | |
| WO | 0216482 | A2 | | 2/2002 | |
| WO | WO-2015009938 | A1 | * | 1/2015 | ........... B29C 70/384 |
| WO | WO-2018203768 | A1 | * | 11/2018 | ............. B29C 48/18 |

* cited by examiner

503

502

502

MELT IMPREGNATION DEVICE WITH AUTOMATIC LIFTING CHANNEL FOR ADDITIVE MANUFACTURING FILAMENTS

CROSS REFERENCE TO THE RELATED APPLICATIONS

This application is the national phase entry of International Application No. PCT/CN2022/107550, filed on Jul. 23, 2022, which is based upon and claims priority to Chinese Patent Application No. 202210518890.X, filed on May 13, 2022, the entire contents of which are incorporated herein by reference.

TECHNICAL FIELD

The present invention belongs to the field of continuous fiber reinforced thermoplastic resin matrix composites, and specifically relates to a composite filament melt impregnation device with an automatic lifting channel for additive manufacturing.

BACKGROUND

Continuous fiber resin matrix composites, as a type of novel and high-performance materials, are currently widely used in the fields of aerospace, wind power generation, rail transit, etc., and have broad application prospects in the civilian field. With the progress of related research on novel high-performance thermoplastic resin, its performance is comparable to conventional thermosetting resin, and it has become a focus of current research and application due to its environment friendliness and good bio-compatibility. The characteristics of thermoplastic composites make them almost perfectly suitable for a fused deposition modeling (FDM) process in 3D printing, but their poor in-situ impregnation effect results in high pore content of printed members, and their poor fiber and resin bonding effect greatly limits the application and development of this technology. Pre-impregnated filaments for 3D printing can completely coat resin, thereby greatly improving the forming quality and strength of 3D printed members. The conventional solution impregnation method reduces the resin content and cannot achieve effective bonding during 3D printing. Currently, the main method for filament forming is melt impregnation. However, due to the poor flowability and high viscosity of thermoplastic resin, problems such as filament breakage and blockage are prone to occur during impregnation. Meanwhile, convenient adjustment of filament diameter is required in consideration of adjustment of fiber volume fractions and diameter changes of printing filaments. Therefore, design of an impregnation device that facilitates filament replacement and can quickly adjust a filament forming size has become a focus and difficulty in the art.

Some impregnation devices for preparing continuous fiber reinforced thermoplastic resin composites have been disclosed. For example, the patent application No. CN204674042U discloses a melt impregnation die head system, including a melt guide device and a glass fiber impregnation device arranged below the melt guide device. The system is detachable, which facilitates replacement of a guide roller and a tension shaft inside a frame, accelerates dismounting and mounting, improves the fusion effect of glass fibers and a polypropylene melt, and improves overall production efficiency. However, the system has no lifting device, so safety accidents are likely to occur in high-temperature operations required to handle filament breakage problems, and variable diameter filaments cannot be prepared. The patent application No. CN207859241U discloses a continuous fiber reinforced thermoplastic resin composite melt impregnation device, which includes a toothed structure, a non-contact impregnation roller, a contact tension roller, and a non-contact roller. The melt impregnation device can prepare continuous fiber reinforced thermoplastic resin composites. However, the melt impregnation device also has no lifting device, so safety accidents are likely to occur in high-temperature operations required to handle filament breakage problems, and variable diameter filaments cannot be prepared. The patent application No. CN102848489A discloses a melt impregnation machine head and method for forming continuous long fiber reinforced thermoplastic resin. A melt distribution channel and an impregnation channel are arranged in the machine head to maintain consistent pressure and flow rate of a melt in contact with each long fiber bundle, thereby ensuring a balanced impregnation effect between continuous long fiber bundles. However, the machine head also has no lifting device, so safety accidents are likely to occur in high-temperature operations required to handle filament breakage problems, and variable diameter filaments cannot be prepared.

SUMMARY

To solve the above problems, the present invention discloses a composite filament melt impregnation device with an automatic lifting channel for additive manufacturing, which achieves automatic lifting of the channel, and facilitates treatment of broken filaments and replacement of fibers while maintaining a high temperature and resin melting state, thereby greatly improving production continuity and efficiency.

A composite filament melt impregnation device with an automatic lifting channel for additive manufacturing includes a mechanical lifting device, a heating device, a curved resin impregnation channel, a filament guide block, a single screw extruder, a replaceable combination die nozzle, and a resin riser; the mechanical lifting device includes multiple sets of coordinated and synchronized lead screws, guide rails, and motors to automatically lift and lower the channel; the heating device includes a heating resistor outside a screw barrel of the screw extruder, multiple sets of heating blocks for controlling an impregnation temperature up and down the channel, and a heating resistor at the replaceable combination die nozzle; the filament guide block is located at a fiber inlet in the front of the channel to adjust the angle of fibers entering the impregnation channel, so as to reduce wear; the curved resin impregnation channel is an S-shaped curved channel formed by upper and lower fitting pressure blocks with trapezoidal slots; the screw extruder is located on a side of the impregnation channel and delivers molten resin into the channel uniformly; the replaceable combination die nozzle is located at a rear part of the impregnation channel; and the resin riser is located below the replaceable die nozzle.

Further, the mechanical lifting device is equipped with at least four sets of opposite coordinated and synchronized lead screws, guide rails, and motors, lower parts of the guide rails are connected to an operating platform to ensure stability during operation, an upper half part of the curved channel is connected to the guide rails by ball screws and connecting blocks, and the screws are driven by the motors to rotate to achieve automatic lifting, lowering, and stabilization of the channel.

Further, the temperature variation range of the heating device is set according to the type of thermoplastic resin, the heating blocks at the upper part of the channel are uniformly distributed on an upper cover plate, and the heating blocks at the lower part of the channel are uniformly distributed on a lower bottom plate and in a lower W-shaped pressure block to ensure a stable temperature in the channel.

Further, the filament guide block is located at the fiber inlet in the front of the channel, and consists of at least two pairs of rotating shafts in horizontal and longitudinal directions, to ensure that the fibers enter the impregnation channel within an angle range.

Further, an impregnation angle of the curved channel is 120°, its curved portion is chamfered to reduce fiber wear during impregnation, and the trapezoidal grooves are formed at the middle parts of the upper and lower pressure blocks as an impregnation passage between the resin and the fibers, which provides a movement space for the fibers and prevents excessive displacement of the fibers.

Further, a vertical fusion cavity is reserved at the connection between a tail end of the channel and the replaceable combination die nozzle, so that the resin riser is in communication with the replaceable combination die nozzle.

Further, the replaceable combination die nozzle consists of a connection segment and a replacement segment, the connection segment is used for being connected to the impregnation channel, a heating resistance coil is wound on the connection segment to ensure resin flow at the die nozzle, and the replacement segment is a filament forming outlet and has, but is not limited to, a replaceable diameter of 0.6, 0.8, 1.0, or 1.2 mm.

Further, the resin riser is located below the combination die nozzle and is in communication with the combination die nozzle, a lower part of the resin riser is provided with a rectangular notch to facilitate resin outflow, a threaded pressure block and a spring are arranged at a top end of the riser, and the pressure block is controlled to be screwed in and out according to the filament forming quality to adjust the compression force of the spring, so as to discharge excess resin from the riser and improve the filament forming quality.

The working principle of the present invention is as follows:

After a temperature parameter is set according to the selected resin, the mechanical lifting device is controlled to lift the upper impregnation channel portion, and a dry carbon fiber filament is threaded through the filament guide block, the impregnation channel, and the replaceable die nozzle. Then, the mechanical lifting device is controlled to lower until the upper impregnation channel portion is tightly attached to the lower impregnation channel portion, to complete an entire threading operation. The extruder is activated and the carbon fiber filament is pulled. Under the effects of a curved structure inside the impregnation channel and melt pressure, the filament is subjected to melt impregnation, so as to obtain a thermoplastic resin matrix composite filament with good impregnation. The design of the lifting channel reduces the dependence of lifting on manpower in the processes of threading, filament replacement, and the like, thereby greatly reducing safety hazards in the production process. Meanwhile, the design of the replaceable die nozzle achieves convenient replacement of die nozzles with different calibers in the forming process without repeated lifting and threading operations.

Compared with existing composite filament melt impregnation devices, the advantages of the present invention are as follows:

1. Automatic lifting of the channel is achieved by the mechanical lifting device to facilitate treatment of broken filaments and replacement of fibers while maintaining a high temperature and resin melting state, thereby greatly improving production continuity and efficiency.

2. The internal structural design of the guide block and the channel reduces the occurrence of broken filaments and hairiness caused by excessive friction due to fiber displacement in the impregnation process.

3. The riser achieves real-time adjustment of a resin coating quantity on the surface of the formed filament, which facilitates real-time control on the filament forming quality. The design of the replaceable combination die nozzle ensures convenient control on filament diameter in the production process, thereby improving the applicability and production efficiency of the impregnation device.

DETAILED DESCRIPTION OF THE EMBODIMENTS

The present invention will be further explained below with reference to the accompanying drawings and specific implementations. It should be understood that the following specific implementations are only used to illustrate the present invention and not to limit the scope of the present invention. It should be noted that the terms "front", "back", "left", "right", "upper", and "lower" used in the following description refer to the directions in the accompanying drawings, and the terms "inside" and "outside" refer to the directions towards or away from the geometric center of a specific component respectively.

Figure 1:
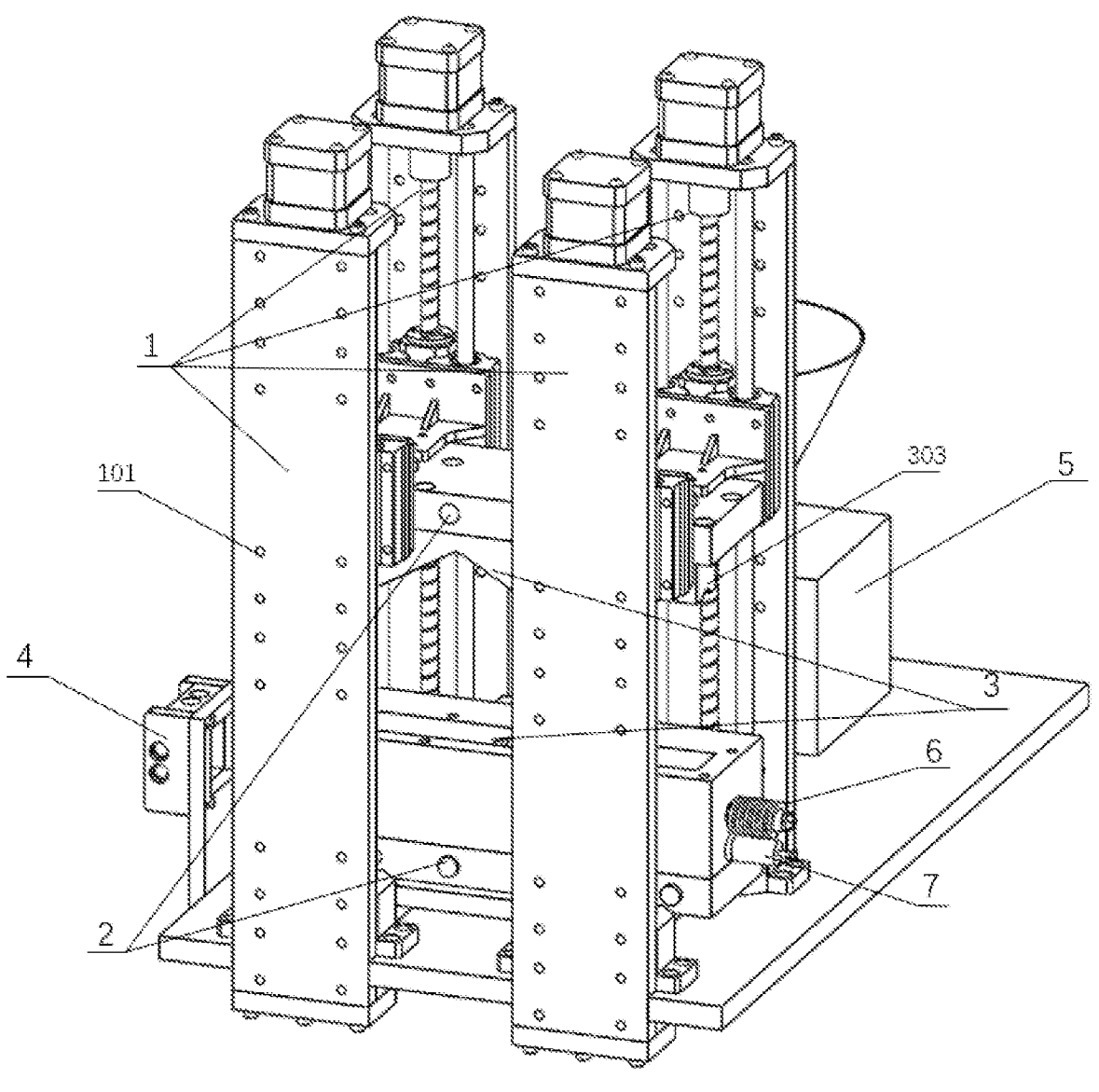
FIG. 1 is an overall structural diagram of a melt impregnation device of the present invention.
Figure 2:
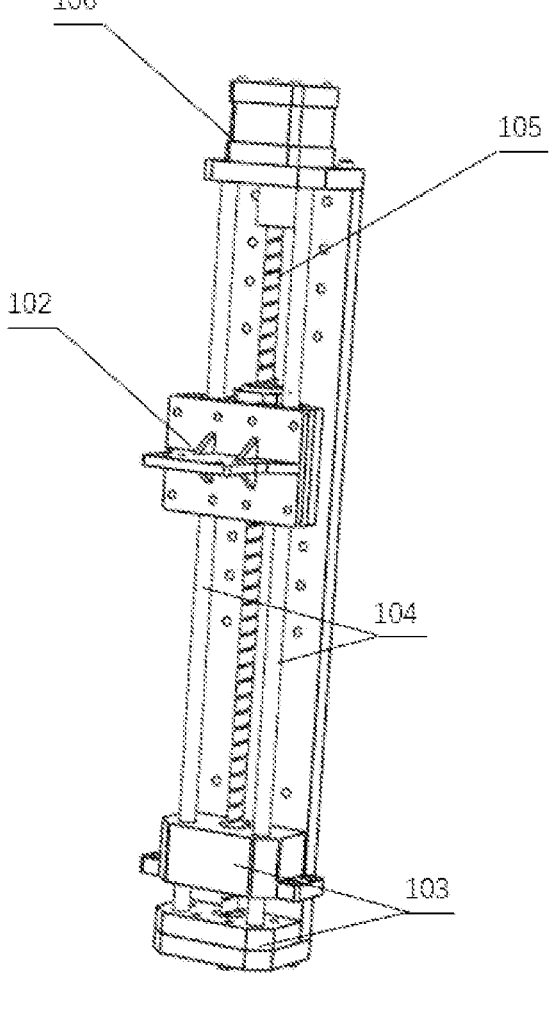
FIG. 2 is a diagram of a mechanical lifting device of a melt impregnation module of the present invention.
Figure 3:
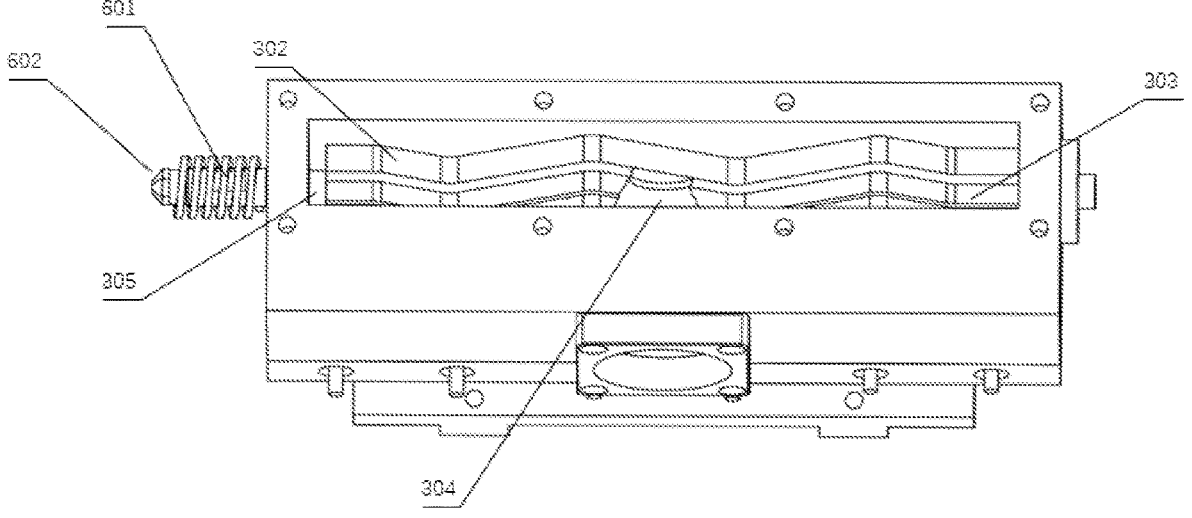
FIG. 3 is a structural diagram of an impregnation channel of the melt impregnation device of the present invention.
Figure 4:
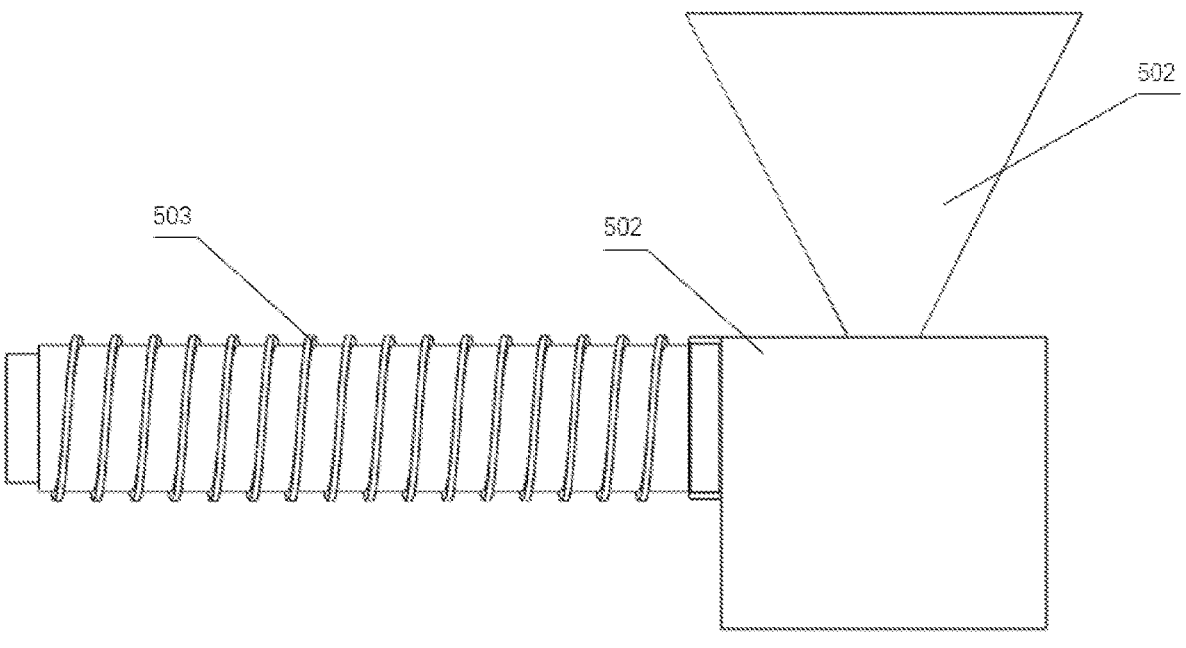
FIG. 4 is a structural diagram of a single screw extruder of the melt impregnation device of the present invention.
Figure 5:
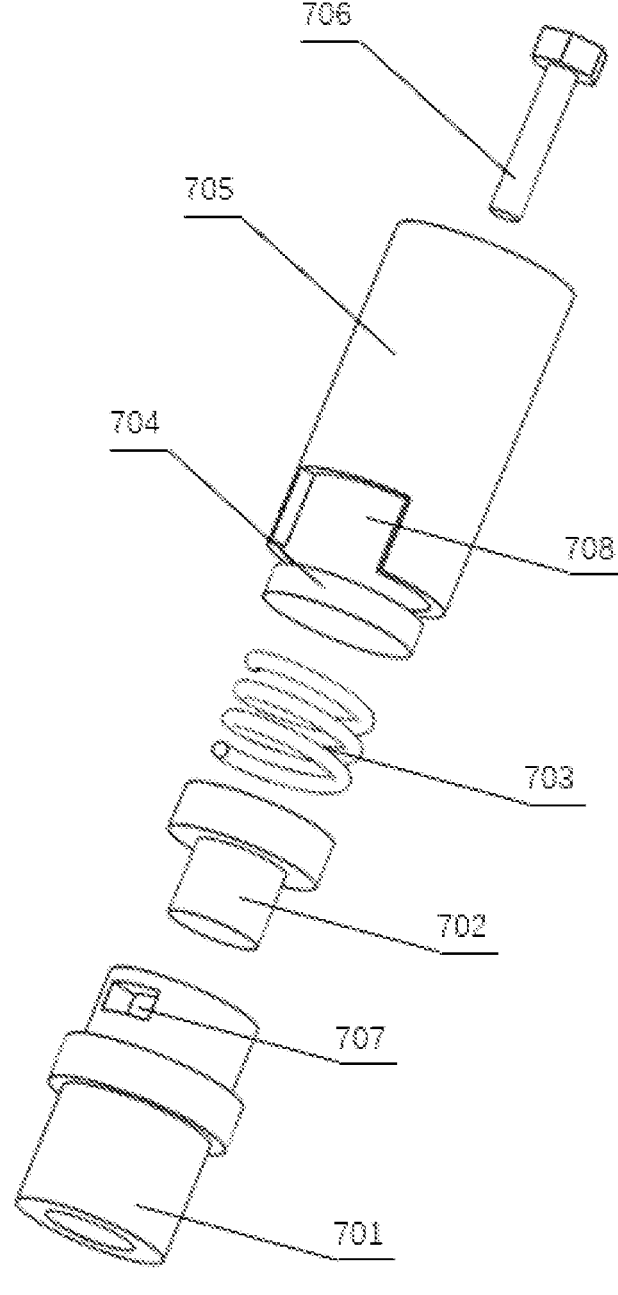
FIG. 5 is an exploded view of a riser structure of the melt impregnation device of the present invention.
Figure 6:
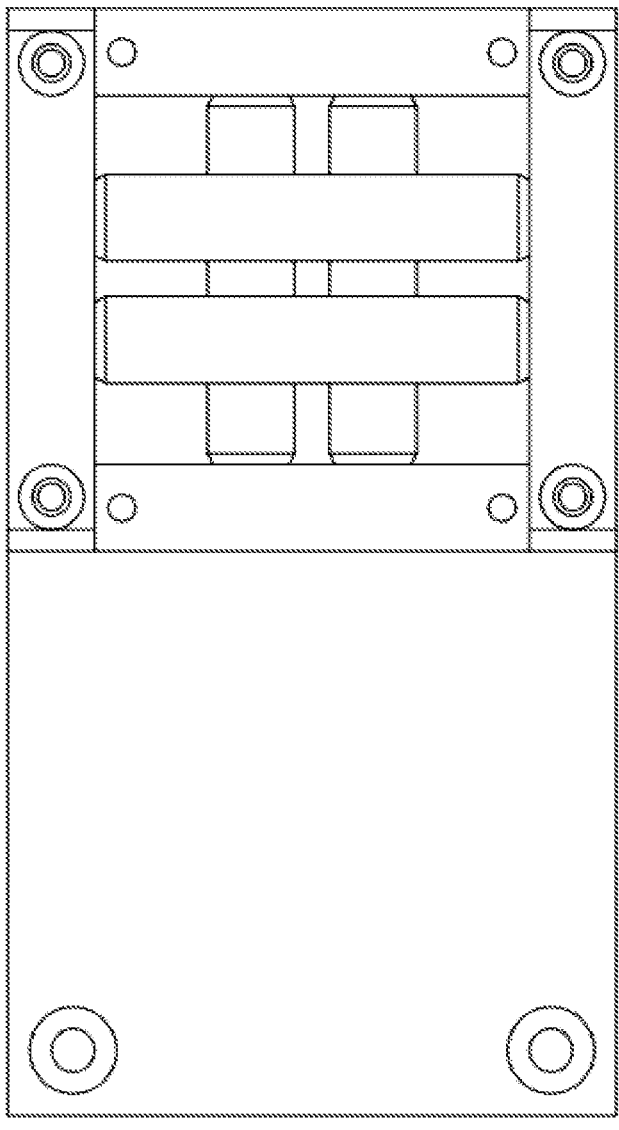
FIG. 6 is a front view of a filament guide block.
Figure 7:
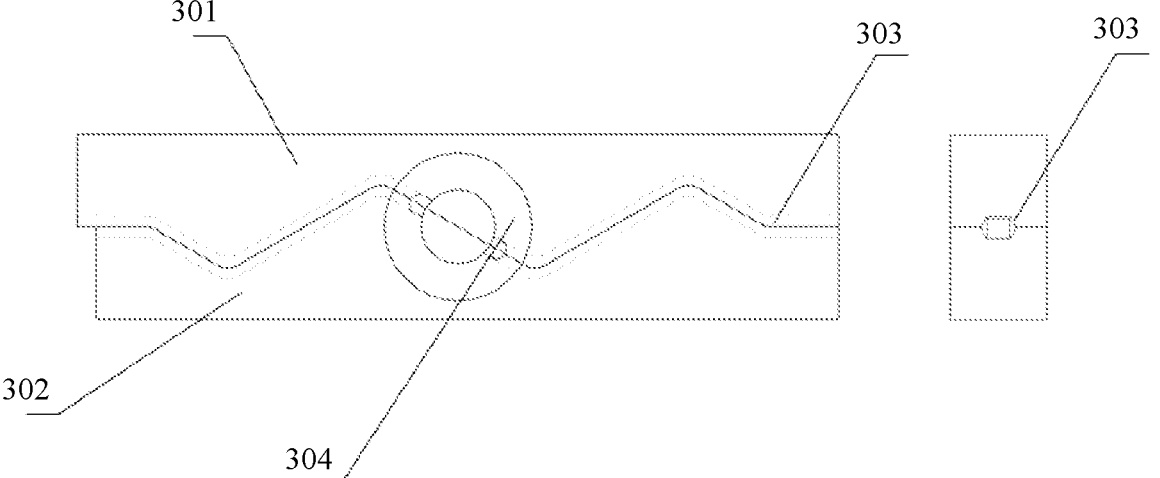
FIG. 7 is an assembly diagram of the melt impregnation channel.

As shown in FIG. 1, the present invention provides a composite filament melt impregnation device with an automatic lifting channel for additive manufacturing, which is used for preparing composite filaments. The forming device includes a mechanical lifting device 1, a heating device 2, a curved resin impregnation channel 3, a filament guide block 4, a single screw extruder 5, a replaceable combination die nozzle 6, and a resin riser 7 arranged in sequence.

As shown in FIGS. 1-5, the mechanical lifting device 1 includes four sets of guide rail lead screws 101 symmetrically distributed on an impregnation module, an upper cover plate connector 102, and a base connector 103. The guide rail lead screw 101 is a mechanical lifting module composed of at least one pair of polished shafts 104, at least one lead screw 105, and a stepper motor 106. The curved resin impregnation channel 3 includes an upper impregnation channel portion 301 and a lower impregnation channel portion 302. A trapezoidal groove 303 as a channel portion is formed at a middle part of each of the upper impregnation channel portion 301 and the lower impregnation channel portion 302, the groove has a plane length of 5-10 mm, a slope length of 5-10 mm, and a slope angle of 15-25°, a truncated cone shaped groove 304 is used for receiving molten resin delivered by the single screw extruder 5 and dispensing the molten resin to the inside of the channel, and a radius of the truncated cone shaped groove gradually transitions from 20 mm to 10 mm. A connecting groove 305 is reserved at an end of the channel to connect the replaceable combination die nozzle 6 with the resin riser 7. The screw extruder 501 is connected to a resin pellet feeding port 502 for feeding resin pellets into the S-shaped curved channel. The replaceable combination die nozzle 6 includes a connection segment 601 and a replacement segment 602, the connection segment 601 is used for being connected to the impregnation channel 3, a heating resistance coil 202 is wound on the connection segment 601 to ensure resin flow at the die nozzle 6, and the replacement segment 602 is a filament forming outlet and has, but is not limited to, a replaceable diameter of 0.6-1.2 mm. The resin riser 7 includes a riser connection 701, a riser plug 702, a riser spring 703, a riser gasket 704, a riser sleeve 705, and a riser bolt 706. A rectangular hole 707 is formed 2 mm near an edge of the riser connection, and a 90° sector hole 708 through which resin flows out smoothly is formed at a corresponding portion of the riser sleeve.

Meanwhile, this embodiment provides a specific process for preparing a filament using the foregoing melt impregnation device:

A goal in this embodiment is to prepare a continuous carbon fiber reinforced polylactic acid fiber (PLA) composite filament having a diameter of 1.3 mm.

The heating device 2 is activated, and a heating resistor 503 of the screw extruder is set to 210° C. After the temperature rises to a set temperature for a period of time, the mechanical lifting device 1 is controlled to lift the upper impregnation channel portion 301. A Toray 3K carbon fiber filament is threaded between two pairs of rollers in the filament guide block 4 and enters the impregnation module, and the carbon fiber filament is placed in the trapezoidal groove 303. The replacement segment 602 having a hole diameter of 1.3 mm in the replaceable combination die nozzle 6 is replaced, and then the carbon fiber filament is threaded through the replaceable combination die nozzle 6 to complete a threading process. The mechanical lifting device 1 is controlled to lower until the upper impregnation channel portion 301 is tightly attached to the lower impregnation channel portion 302. PLA pellets are placed at the resin pellet feeding port 502, the speed of the screw extruder is set to 5 r/min, the riser bolt 706 is loosened, and the situation at the riser is observed. When resin flows out, the fiber filament is pulled to start an impregnation process, the speed of the screw extruder is adjusted to 13 r/min, and the riser bolt 706 is dynamically adjusted according to the resin coating quantity on the surface of the filament to ensure stable filament quality. The above process can achieve safe and stable preparation of a target product.

Another goal in this embodiment is to handle filament breakage during the preparation of a continuous carbon fiber reinforced PLA composite filament having a diameter of 1.3 mm.

The rotation of the screw extruder 5 is stopped, the temperature of heating blocks 2 and the heating resistor 503 of the screw extruder is kept unchanged, and the mechanical lifting device 1 is controlled to lift the upper impregnation channel portion 301. The Toray 3K carbon fiber filament is picked out from the trapezoidal groove 303, clamped, pulled for a distance until its surface resin content is low, and threaded through the replaceable combination die nozzle 6 to complete a threading process. The mechanical lifting device 1 is controlled to lower until the upper impregnation channel portion 301 is tightly attached to the lower impregnation channel portion 302. PLA pellets are placed at the resin pellet feeding port 502, the speed of the screw extruder is set to 5 r/min, the riser bolt 706 is loosened, and the situation at the riser is observed. When resin flows out, the fiber filament is pulled to start an impregnation process, the speed of the screw extruder is adjusted to 13 r/min, and the riser bolt 706 is dynamically adjusted according to the resin coating quantity on the surface of the filament to ensure stable filament quality. The above process can safely and quickly achieve the goal.

A further goal in this embodiment is to change the preparation from a continuous carbon fiber reinforced PLA composite filament having a diameter of 0.8 mm to a continuous carbon fiber reinforced PLA composite filament having a diameter of 1.3 mm.

The rotation of the screw extruder 5 is stopped, the temperature of the heating device 2 and the heating resistor 503 of the screw extruder is kept unchanged, the 0.8 mm replacement segment 602 is unscrewed and threaded out of the filament, and then the 1.3 mm replacement segment 602 is threaded and screwed to the connection segment 601 to complete a die nozzle replacement process. The speed of the screw extruder is set to 5 r/min, the riser bolt 706 is loosened, and the situation at the riser is observed. When resin flows out, the fiber filament is pulled to start an impregnation process, the speed of the screw extruder is adjusted to 13 r/min, and the riser bolt 706 is dynamically adjusted according to the resin coating quantity on the surface of the filament to ensure stable filament quality. The above process can quickly achieve the goal.

The technical means disclosed in the solution of the present invention are not limited to the technical means disclosed in the foregoing implementations, but also include technical solutions formed by any combination of the above technical features.

What is claimed is:

1. A composite filament melt impregnation device with an automatic lifting channel configured for additive manufacturing, comprising a mechanical lifting device, a heating device, a curved resin impregnation channel, a filament guide block, a single screw extruder, a replaceable combination die nozzle, and a resin riser, wherein the curved resin impregnation channel moves up and down through the mechanical lifting device; the heating device comprises multiple sets of heating blocks for controlling an impregnation temperature up and down the curved resin impregnation channel; the filament guide block is located at a fiber inlet in a front of the curved resin impregnation channel, and the single screw extruder is located on a side of the curved resin impregnation channel and configured so that molten resin is uniformly delivered into the curved resin impregnation channel; molten resin is uniformly delivered into the curved resin impregnation channel; the replaceable combination die nozzle is located at a rear part of the curved resin impregnation channel; the resin riser is located below the replaceable combination die nozzle; and the curved resin impregnation channel is an S-shaped curved channel formed by fitting upper and lower pressure blocks having trapezoidal slots.

2. The composite filament melt impregnation device with the automatic lifting channel for additive manufacturing according to claim 1, wherein the mechanical lifting device comprises at least four guide rail lead screw mechanisms symmetrically distributed, and a bottom of each of the at least four guide rail lead screw mechanisms is connected to an operating platform; each of the at least four guide rail lead screw mechanisms comprises polished shafts, a lead screw, a stepper motor, an upper cover plate connector, and a base connector; the polished shafts are symmetrically arranged beside two ends of the lead screw; an output shaft of the stepper motor is connected to the lead screw; the upper cover plate connector is in sliding connection with the lead screw and the polished shafts respectively, and the upper cover plate connector is connected to an upper half part of the curved resin impregnation channel; and a lower half part of the curved resin impregnation channel is secured on the base connector.

3. The composite filament melt impregnation device with the automatic lifting channel for additive manufacturing according to claim 1, wherein the curved resin impregnation channel comprises an upper impregnation channel portion and a lower impregnation channel portion; a trapezoidal groove as a channel portion is formed at a middle part of each of the upper impregnation channel portion and the lower impregnation channel portion; the trapezoidal groove has a plane length of 5 mm-10 mm, a slope length of 5 mm-10 mm, and a slope angle of 15°-25°; a truncated cone shaped groove is configured to receive the molten resin delivered by the single screw extruder and dispense the molten resin to an inside of the curved resin impregnation channel, and a radius of the truncated cone shaped groove gradually transitions from 20 mm at the single screw extruder to 10 mm at the curved resin impregnation channel; and a connecting groove is reserved at a tail end of the curved resin impregnation channel to connect the replaceable combination die nozzle with the resin riser.

4. The composite filament melt impregnation device with the automatic lifting channel for additive manufacturing according to claim 1, wherein the single screw extruder is connected to a resin pellet feeding port to feed resin pellets into the curved resin impregnation channel; and a surface of the single screw extruder is wound with a screw extruder heating resistor.

5. The composite filament melt impregnation device with the automatic lifting channel for additive manufacturing according to claim 1, wherein the replaceable combination die nozzle comprises a connection segment and a replacement segment, wherein the connection segment is configured to be connected to the curved resin impregnation channel, a heating resistance coil is wound on the connection segment to ensure resin flow at the replaceable combination die nozzle, and the replacement segment has a replaceable diameter of 0.6 mm-1.2 mm.

6. The composite filament melt impregnation device with the automatic lifting channel for additive manufacturing according to claim 1, wherein the resin riser is arranged below the replaceable combination die nozzle, and the resin riser comprises a riser connection portion, a riser plug, a riser spring, a riser gasket, a riser sleeve, and a riser bolt, wherein the riser connection portion, the riser plug, the riser spring, the riser gasket, the riser sleeve, and the riser bolt are arranged in sequence, and a rectangular hole is formed 2 mm near an edge of the riser connection portion, wherein resin flows out through the rectangular hole; and a 90° sector hole is formed at a portion of the riser sleeve and corresponds to the rectangular hole, wherein the resin flows out smoothly through the 90° sector hole.

7. The composite filament melt impregnation device with the automatic lifting channel for additive manufacturing according to claim 5, wherein the replacement segment is a filament forming outlet, and the replacement segment has a replaceable diameter of 0.6 mm, 0.8 mm, 1.0 mm, or 1.2 mm.

8. The composite filament melt impregnation device with the automatic lifting channel for additive manufacturing according to claim 1, wherein the heating blocks at the upper impregnation channel portion are uniformly distributed on an upper cover plate, and the heating blocks at the lower impregnation channel portion are uniformly distributed in a lower bottom plate to ensure a stable temperature in the curved resin impregnation channel.

9. The composite filament melt impregnation device with the automatic lifting channel for additive manufacturing according to claim 1, wherein the filament guide block is located at the fiber inlet in the front of the curved resin impregnation channel, and the filament guide block comprises at least two pairs of rotating shafts in horizontal and longitudinal directions, to ensure that fibers enter the curved resin impregnation channel within an angle range.

10. The composite filament melt impregnation device with the automatic lifting channel for additive manufacturing according to claim 1, wherein an impregnation angle of the curved resin impregnation channel is 120°, a curved portion of the curved resin impregnation channel is chamfered to reduce fiber wear during impregnation, and trapezoidal grooves are formed at middle parts of the upper and lower pressure blocks as an impregnation passage between the resin and the fibers to provide a movement space for the fibers and prevent excessive displacement of the fibers.

* * * * *